(12) United States Patent
Kim et al.

(10) Patent No.: US 6,236,102 B1
(45) Date of Patent: May 22, 2001

(54) CHIP TYPE THIN FILM CAPACITOR, AND MANUFACTURING METHOD THEREFOR

(75) Inventors: Young Min Kim, Sungnam; Bang Won Oh, Seoul, both of (KR)

(73) Assignee: Samsung Electro-Mechanics Co., Ltd., Seoul (KR)

( * ) Notice: Subject to any disclaimer, the term of this patent is extended or adjusted under 35 U.S.C. 154(b) by 0 days.

(21) Appl. No.: 09/207,182

(22) Filed: Dec. 8, 1998

(30) Foreign Application Priority Data

Dec. 13, 1997 (KR) .................................................. 97-68587
Nov. 30, 1998 (KR) .................................................. 98-51737

(51) Int. Cl.[7] .................................................. H01L 29/72
(52) U.S. Cl. .......................... 257/532; 257/618; 257/750; 257/773; 438/393; 438/396; 438/622; 438/666; 361/306.1
(58) Field of Search ...................... 257/532, 618, 257/750, 773; 438/393, 396, 622, 666; 361/306.1

(56) References Cited

U.S. PATENT DOCUMENTS 4,453,199 * 6/1984 Ritchie et al. ........................ 257/532

* cited by examiner

*Primary Examiner*—Edward Wojciechowicz
(74) *Attorney, Agent, or Firm*—Renner, Otto, Boisselle & Sklar, LLP

(57) ABSTRACT

A chip type thin film capacitor is disclosed. The contact faces between inner electrodes and outer electrodes are expanded. That is, one end portion of each of first and second electrodes 220 and 240 are exposed to the outside, and the upper faces of the first and second electrodes 220 and 240 are etched so that the upper faces would be exposed to the outside. Thus first and second outer electrode connection portions 260 and 270 are formed, and terminal electrodes 280 are formed thereon. Then first and second outer electrodes 290 and 300 are formed thereupon, and a protecting layer 310 is formed by using polyimide upon a second dielectric layer 250.

29 Claims, 8 Drawing Sheets

US 6,236,102 B1

CHIP TYPE THIN FILM CAPACITOR, AND MANUFACTURING METHOD THEREFOR

BACKGROUND OF THE INVENTION

1. Field of the Invention

The present invention relates to a chip type thin film capacitor which is used as a component for high frequency apparatuses, satellite communication system and the like. Particularly, the present invention relates to a chip type thin film capacitor and a manufacturing method therefor, in which the contact areas between inner electrodes and outer electrodes of the thin film capacitor are expanded, so that the defect rate of the product can be lowered, and the equivalent serial resistance can be also lowered.

2. Description of the Prior Art

In the generally known chip type thin film capacitor, the current situation is as follows. That is, when it is used as components of high frequency apparatuses or the satellite communication system, a relatively low equivalent serial resistance (ESR) and a high capacitance are required. Therefore, when it is manufactured, a lower electrode, a dielectric layer, and an upper electrode are formed upon a glass or ceramic substrate in the cited sequence. Then the electrodes are patterned to the required form, and then, a dielectric protecting layer is printed to protect the inner electrodes. Then an upper plate is made to stick on the dielectric protecting layer by using an epoxy resin, and outer electrodes are formed on the both sides of the structure, in such a manner that the upper and lower electrodes would be connected to the outer electrodes, thereby manufacturing a thin film capacitor having a low ESR value.

This is specifically illustrated in FIG. 1. As shown in FIG. 1, a lower electrode 52 is formed upon a glass or ceramic substrate 51 in such a manner that a side face of the electrode 52 should be exposed. Then a dieectric layer 53 is formed upon the lower electrode 52, and then, an upper electrode 54 is formed upon the dielectric layer 53 in such a manner that the opposite side face of the electrode 54 should be exposed.

Then the upper and lower electrodes 54 and 52 and the dielectric layer 53 are pattern to the required form. Then in order to protect the upper electrode 54, a dielectric protecting layer 55 is printed upon the structure. Then an upper plate 56 is made to adhere on the dielectric protecting layer by using an epoxy resin adhesive. Then an electrolytic plating is carried out to form outer electrodes 58 on both side faces of the substrate 51 on which the upper and lower electrodes 54 and 52 have been formed.

Thus as shown in FIG. 2, by providing the dielectric layer 53, one end of each of the upper and lower electrodes 54 and 52 is made to be connected to each of the outer electrodes 58 which have been formed on both side faces of the substrate 51 respectively. In this manner, the manufacture of the capacitor is completed.

In the above described conventional thin film capacitor, in order to obtain a relatively low ESR value, the contact areas between the upper and lower electrodes 54 and 52 and the outer electrodes 58 are increased. For this purpose, the both ends are ground or etched, so that the upper and lower electrodes 54 and 52 having a thickness of 2 μm or less would be exposed. Then the outer electrodes are coupled to them respectively, thereby increasing the contact areas between the two sets of the electrodes.

However, in the above described conventional chip type thin film capacitor, the upper and lower electrodes 54 and 52 having a thickness of 2μ or less are ground or etched so that they would be exposed to the outside. Then the outer electrodes 58 are connected to the sides of them. Therefore, the outer electrodes 58 are connected only to the tips of the upper and lower electrodes 54 and 52. Therefore, the areas of the inter-electrode connections are not sufficient. Further, during the electrolytic plating for connecting the outer electrodes 58 to the tips of the upper and lower electrodes 54 and 52, the upper and lower electrodes 54 and 52 are liable to be short-circuited, thereby causing product defects. Further, the imperfect contact between the upper and lower electrodes 54 and 52 and the outer electrodes 58 degrades the product reliability, as well as lowering the yield.

Meanwhile, another thin film capacitor manufacturing method has been proposed in which a low ESR value is attained at a low cost.

This method is disclosed in U.S. Pat. No. 4,453,199, and is as shown in FIG. 3. As shown in this drawing, upon an insulating substrate 100 made of glass or a ceramic material, there is deposited a thin film conductive layer 110. Then the thin film conductive layer 110 which is an electrode is patterned into rows and columns, and then, a dielectric layer 130 is formed in such a manner that the entire surface of the thin film conductive layer 110 should be covered.

Then a plurality of discontinuous thin film conductive layers 140 are formed again on the dielectric layer 130, in such a manner that the edges of the thin film conductive layers 140 should be exposed to the outside. Then an insulating layer 150 is formed to cover the entire surface of the thin film conductive layers 140. Then the insulating substrate 100 is cut vertically, so that the edges of the thin film conductive layers 110 and 140 would be exposed. Then a terminal layer is formed, in such a manner that terminal electrodes should be electrically connected to the exposed portions of the thin film conductive layers 110 and 140, thereby completing the manufacture of the thin film capacitor.

However, in the above described conventional chip type thin film capacitor, when the insulating substrate 100 is cut after the formation of the layers, the exposed edges of the thin film conductive layers 110 and 140 are extremely small. Therefore, when the outer terminal electrodes are formed, their contacts are very insufficient. Further, during the electrolytic plating for connecting the conductive layers 110 and 140 and the terminal electrodes together respectively, short circuits are formed between the conductive layers 110 and 140, thereby causing product defects. Further, low ESR value cannot be obtained due to the insufficient contacts between the conductive layers 110 and 140 and the terminal electrodes.

SUMMARY OF THE INVENTION

The present invention is intended to overcome the above described disadvantages of the conventional techniques.

Therefore, it is an object of the present invention to provide a chip type thin film capacitor in which the contact areas between upper and lower electrodes (as inner electrodes) and outer electrodes contacted to the upper faces and side faces of the upper and lower electrodes are expanded so as to make it possible to obtain a low ESR value, and the formation of short circuits is prevented owing to the expanded contact areas between mentioned electrodes so as to prevent product defects and to stabilize the contacts between the inner and outer electrodes.

It is another object of the present invention to provide a method for manufacturing a chip type thin film capacitor, in which the contact areas between upper and lower electrodes (as inner electrodes) and outer electrodes contacted to the upper faces and side faces of the upper and lower electrodes are expanded so as to make it possible to obtain superior characteristics and to prevent the product defects.

In achieving the above objects, the chip type thin film capacitor according to the present invention includes: an insulating substrate; a thin film type conductive first electrode formed upon the insulating substrate starting from one edge of the substrate toward an opposite edge of it, and having a first outer electrode connection portion at an edge portion corresponding to an edge of the substrate; a first dielectric layer formed upon the first electrode, for insulating the first electrode; a second electrode formed upon the first dielectric layer starting from the opposite edge of the substrate to be overlapped with a portion of the first electrode, and having a second outer electrode connection portion at an edge portion corresponding to the opposite edge of the substrate; a second dielectric layer formed upon an area other than the second outer electrode connection portion of the second electrode, for protecting the second electrode; a first outer electrode formed upon an area corresponding to the first outer electrode connection portion, for being electrically connected to the first electrode; and a second outer electrode formed upon an area corresponding to the second outer electrode connection portion, for being electrically connected to the second electrode.

In another aspect of the present invention, the method for manufacturing the chip type thin film capacitor according to the present invention includes the steps of: forming a thin film conductive layer upon an insulating substrate, and removing unnecessary portions of the conductive layer to form a plurality of discontinuous mutually electrically isolated rows and columns, thereby forming a first electrode layer; forming a first dielectric layer upon the first electrode layer to insulate the first electrode layer; forming a thin film conductive layer upon the first dielectric layer, and removing unnecessary portions of the conductive layer to form a plurality of discontinuous mutually electrically isolated rows and columns of the conductive layer so as to form a second electrode layer, conductive areas of the second electrode layer and conductive areas of the first electrode layer being partly overlapped, and one edge portion being provided at an end of each of overlapped portions; forming a second dielectric layer upon the second electrode layer, for protecting the second electrode layer; removing portions of the first and second dielectric layers corresponding to non-overlapped portions of the first and second electrode layers, thereby forming first and second outer electrode connection portions for the conductive layers of the first and second electrode layers; forming a thin film conductive layer upon the second dielectric layer and the first and second outer electrode connection portions, and removing portions of the thin film conductive layer corresponding to other than the first and second outer electrode connection portions, thereby forming an upper layer of terminal electrodes for forming first and second outer electrodes; forming a thin film conductive layer on the bottom of the insulating substrate, and removing portions of the conductive layer approximately corresponding to areas other than the first and second outer electrode connection portions, thereby forming a lower layer of terminal electrodes for forming outer electrodes; cutting the insulating substrate into halves so as to divide the first and second outer electrode connection portions into halves in a form of bars with the terminal electrodes being formed thereon, thereby making edge portions of conductive areas of the first and second electrode layers exposed; forming thin film conductive layers on side faces of the bar shaped cut portions of the substrate, thereby forming side faces of terminal electrodes for forming first and second outer electrodes; cutting the bar shaped substrate into capacitor chips; and forming the first and second outer electrodes by making them electrically connected to upper faces, side faces and bottom faces of the terminal electrodes.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENT

Figure 1:
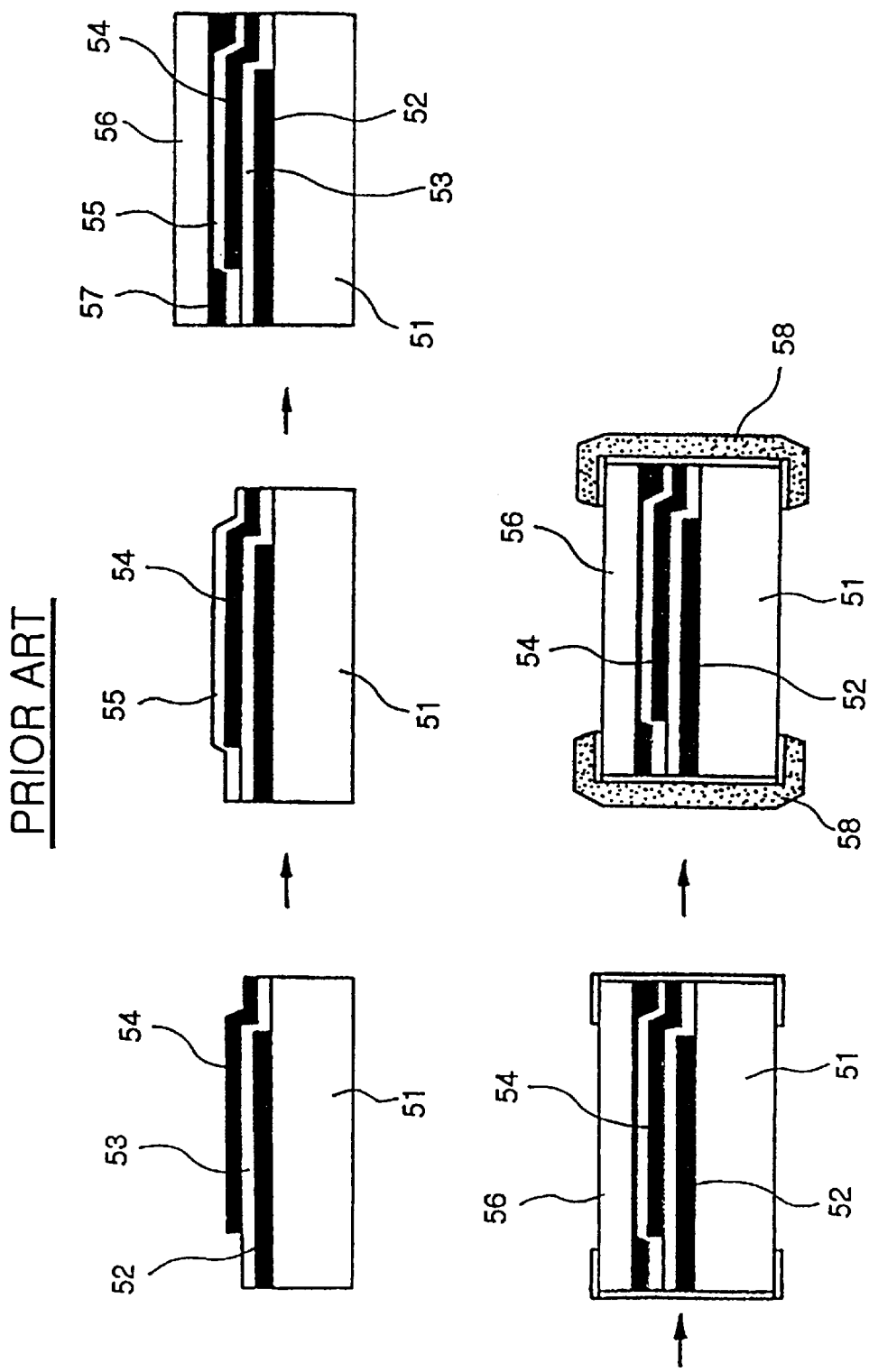
FIG. 1 illustrates the manufacturing process for the general chip type thin film capacitor.
Figure 2:
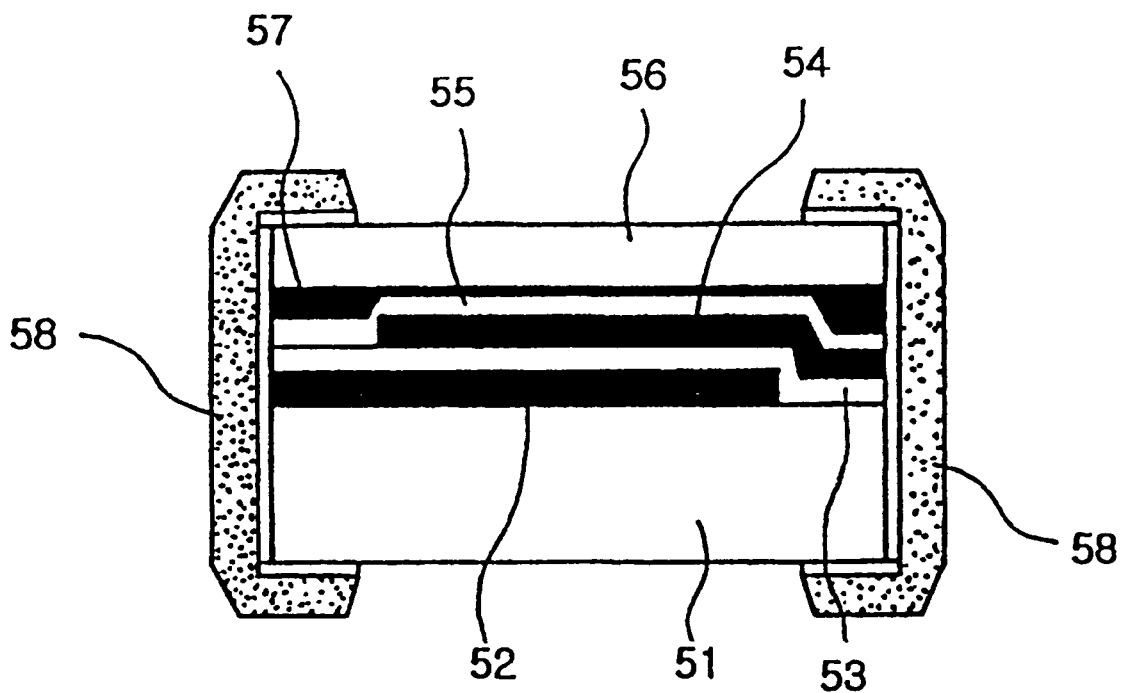
FIG. 2 illustrates the constitution of a conventional chip type thin film capacitor.
Figure 3:
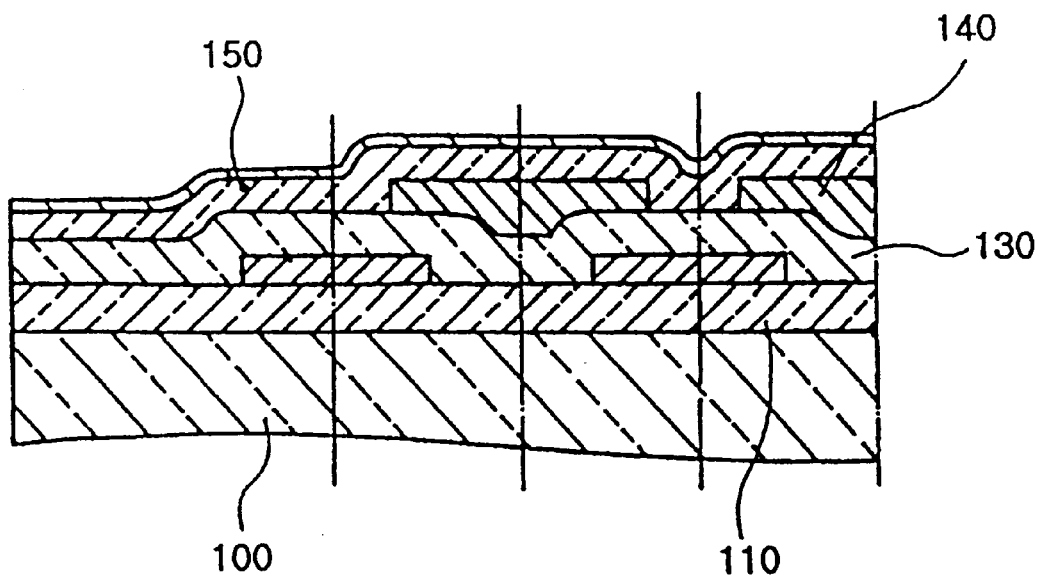
FIG. 3 illustrates the constitution of another conventional chip type thin film capacitor.
Figure 4A:
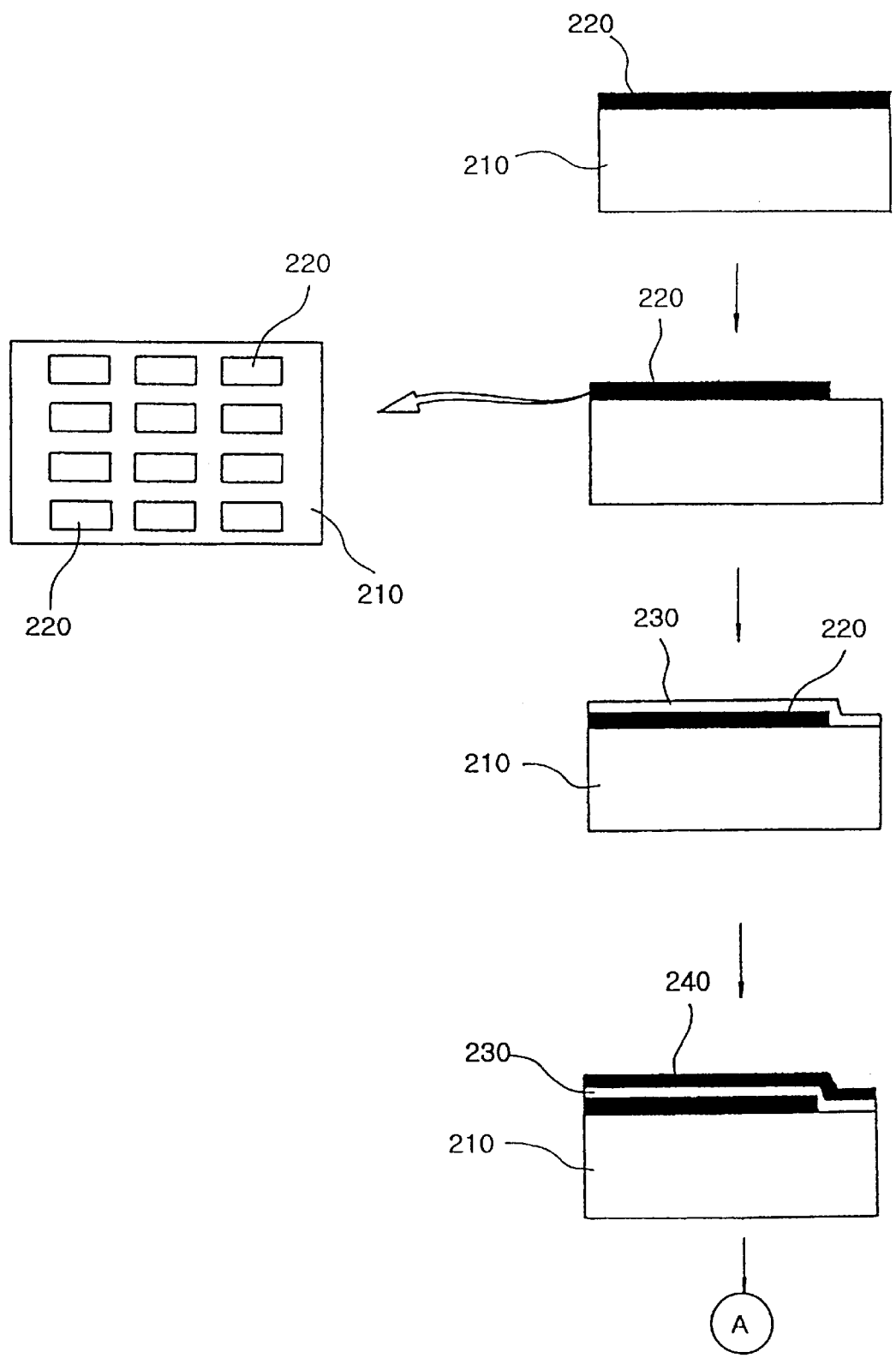
FIG. 4 illustrates the manufacturing process for the chip type thin film capacitor according to the present invention.
Figure 4B:
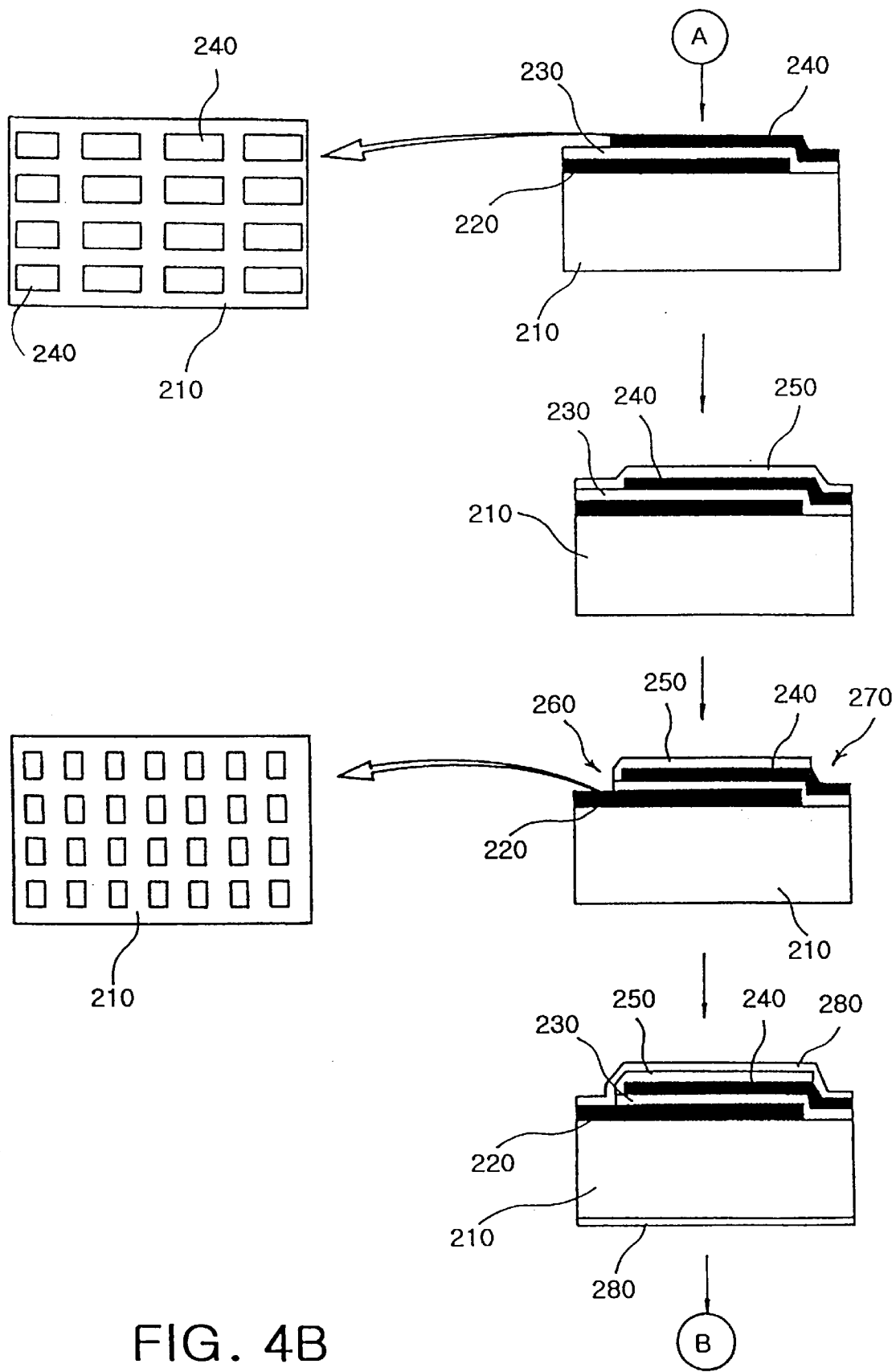
Figure 4C:
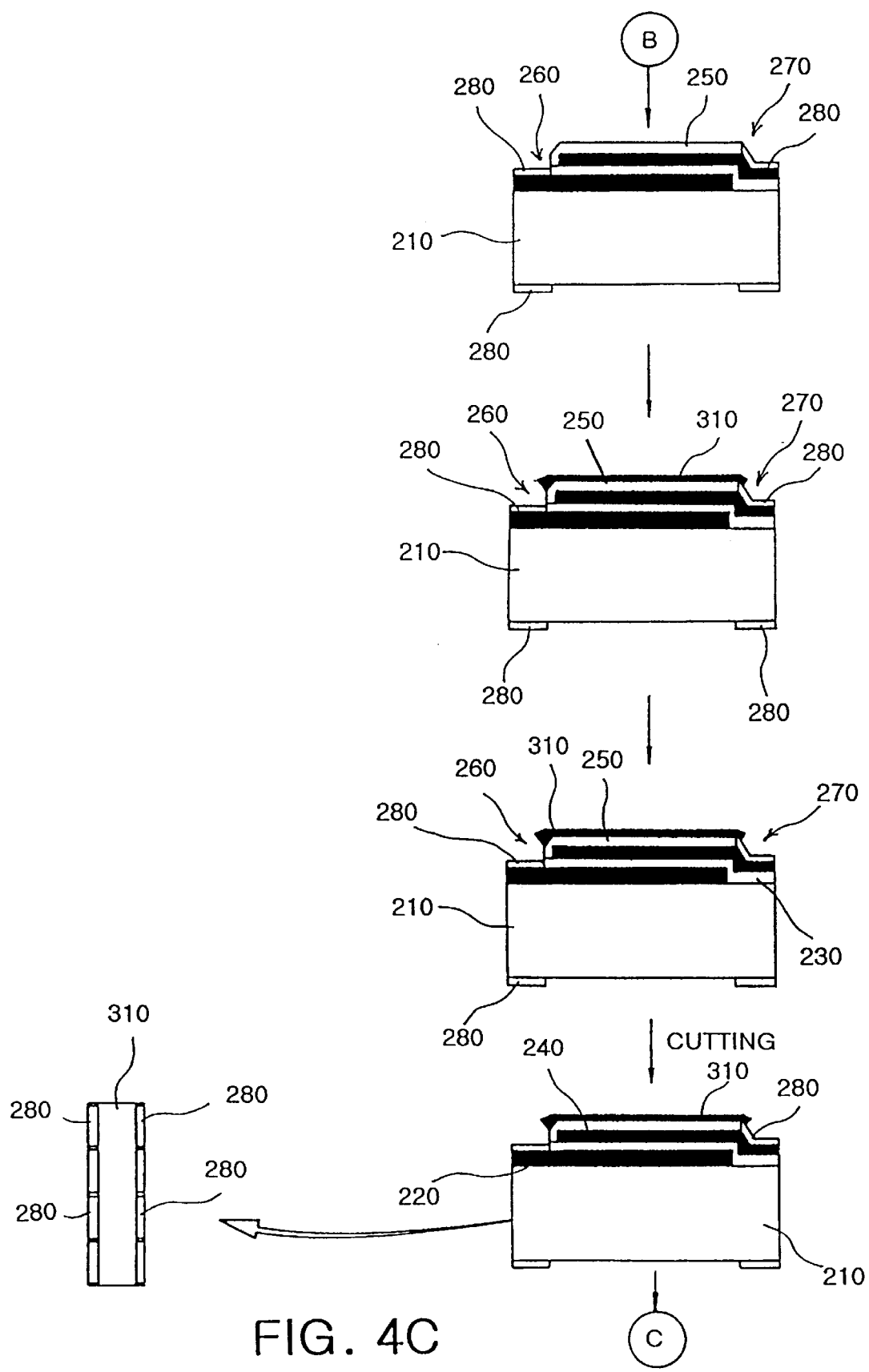
Figure 4D:
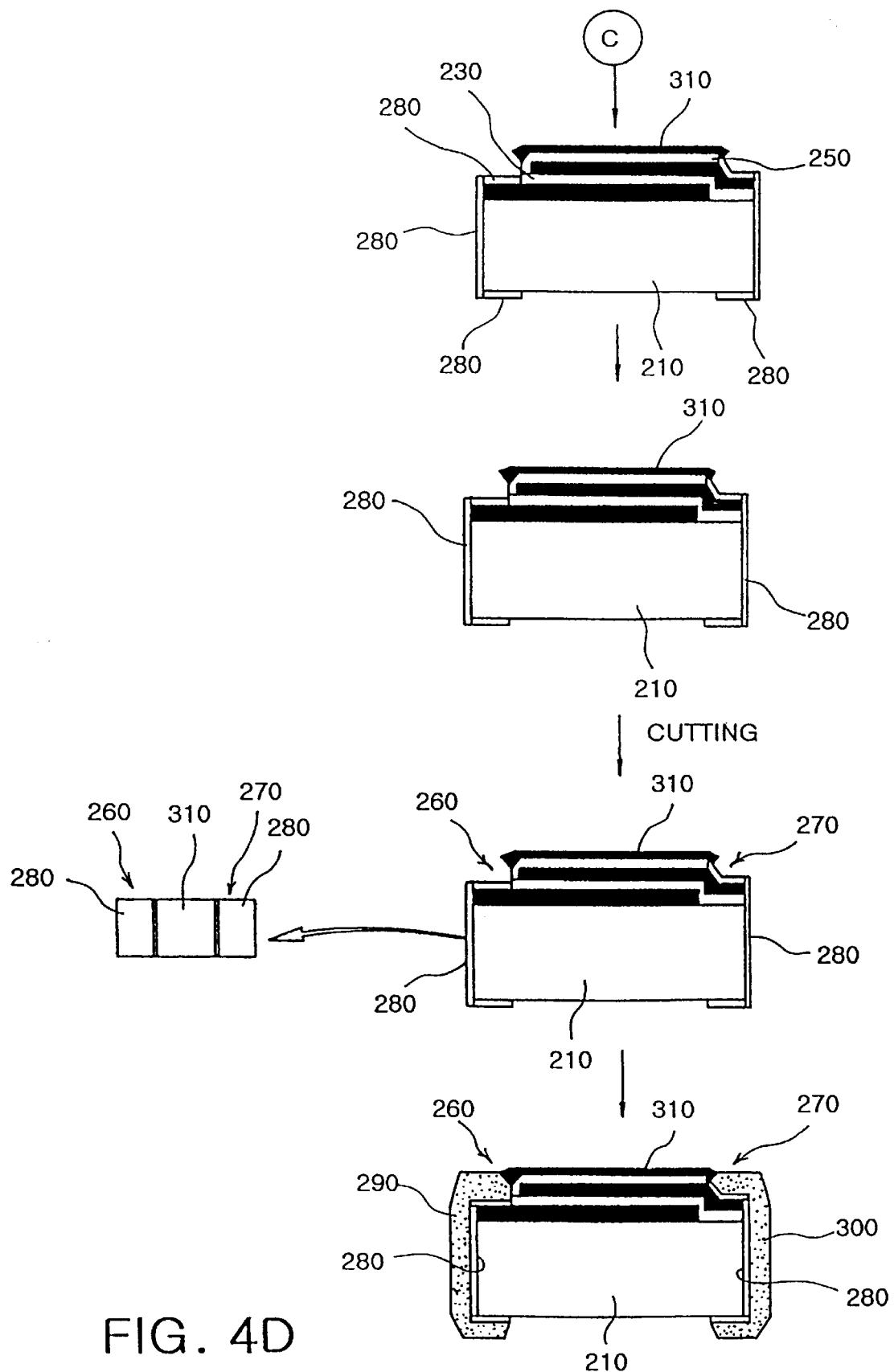
Figure 5:
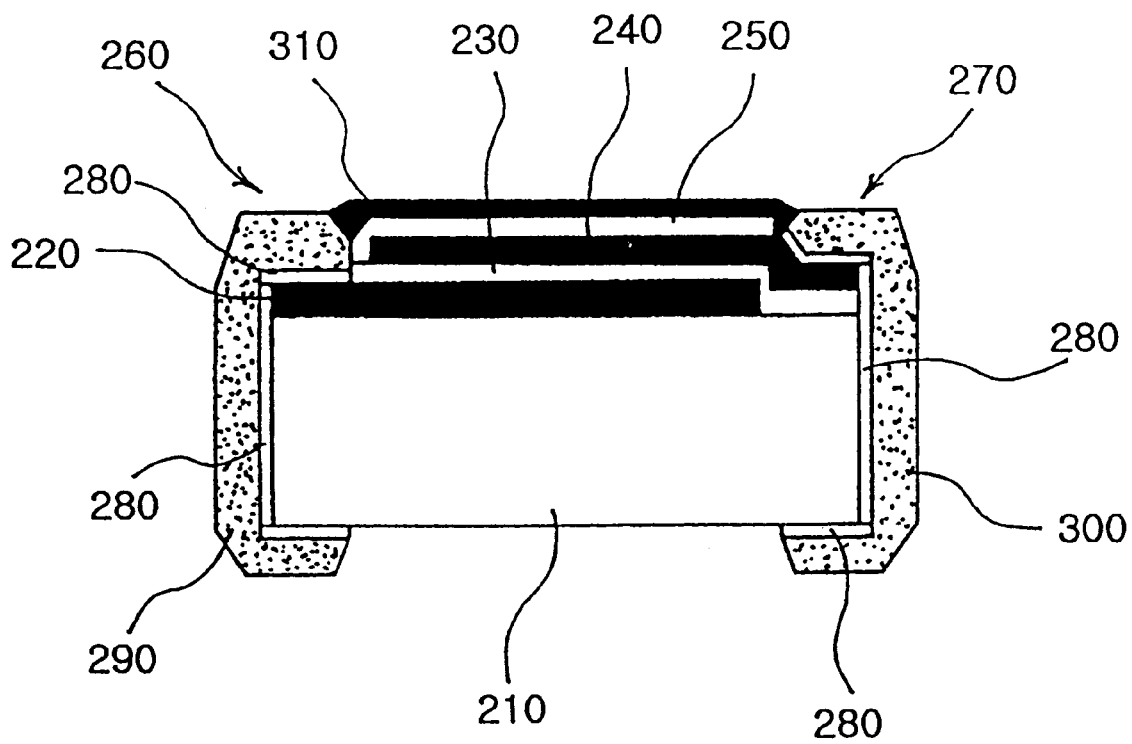
FIG. 5 illustrates the constitution of the chip type thin film capacitor according to the present invention.

FIG. 4 illustrates the manufacturing process for the chip type thin film capacitor according to the present invention. FIG. 5 illustrates the constitution of the chip type thin film capacitor according to the present invention.

An insulating substrate 210 made of glass or alumina is prepared. Then a first electrode 220 is deposited on the entire surface of the substrate 210 starting from one edge of the substrate toward the opposite edge. The first electrode 220 is formed based on a physical vapor deposition process such as sputtering or evaporating, by using Al or Cu. Further, a first outer electrode connection portion 260 is formed on a side face of the insulating substrate 210.

Then, a first dielectric layer 230 is formed upon the first electrode 220 by applying a chemical vapor deposition process (CVD process) to protect the first electrode 220. A second electrode 240 is formed upon the first dielectric layer 230 starting from the opposite edge of the substrate 210 to be overlapped with an portion of the first electrode. This second electrode 240 is formed by applying a physical vapor deposition process such as sputtering or evaporating. Then, a second outer electrode connection portion 270 is formed on the opposite side face of the substrate 210.

That is, the first electrode 220 which is formed on the substrate 210 has an end exposed to the outside of the substrate 210. Further, the second electrode 240 which is formed upon the first dielectric layer 230 has an end which is exposed to the outside.

Further, the first dielectric layer 230 is composed of $SiO_2$ or SiN, and on it, there is formed a first outer electrode connection portion 260. Further, the upper face of one edge of the lower electrode 220 is made to be exposed by etching. Further, a second outer electrode connection portion 270 is formed on another edge of the second dielectric layer 250, and the upper face of another edge of the upper electrode 240 is made to be exposed by etching.

The first and second outer electrode connection portions 260 and 270 which are formed upon the first and second electrodes 220 and 240 respectively are etched by using an etching solution composed of CH₃COOH and NH₄F at a mole ratio of 2:1.

The first and second outer electrode connection portions 260 and 270 are thus etched so that side faces and upper faces of the first and second electrodes 220 and 240 would be exposed. As shown in FIG. 5, the both side faces and the upper and lower faces of the substrate 210 and the portions 260 and 270 are coated with Al or Cr in a thickness of 0.1 μm to increase the adhesive strength. Then Cu is deposited in a thickness of 0.5 μm, thereby forming terminal electrodes 280. Then a first outer electrode 290 is formed on an area which includes the first outer electrode connection portion 260, so as to connect the electrode 290 to the first electrode 220. Further, a second outer electrode 300 is formed on an area which includes the second outer electrode connection portion 270, so as to connect the electrode 300 to the second electrode 240.

The first and second outer electrodes 290 and 300 are formed by plating Cu, Ni and Sn/Pb in the cited sequential manner. In order to protect the first and second outer electrode connection portions 260 and 270, polyimide is printed on the second dielectric layer 250, thereby forming a protecting layer 310.

Now the method for manufacturing the chip type thin film capacitor according to the present invention will be described.

As shown in FIG. 4, a thin film conductive layer is formed upon an insulating substrate 210. Then a first electrode 220 is formed based on a physical vapor deposition process such as sputtering or evaporating by dividing the conductive layer into a plurality of discontinuous, mutually electrically isolated rows and columns, and the first electrode 220 is composed of Al or Cu. Further, a first outer electrode connection portion 260 is formed on a side face of the insulating substrate 210. Then a first dielectric layer 230 is deposited by applying a chemical vapor deposition process (CVD process) on the first electrode 220.

Then a thin film conductive layer is formed upon the first dielectric layer 230 by using Al or Cu based on a physical vapor deposition process such as sputtering or evaporating. Then a second electrode 240 is formed by dividing the conductive layer into a plurality of discontinuous, mutually electrically isolated rows and columns, and the first electrode 220 is composed of Al or Cu. Here, the conductive areas of the first and second electrodes 220 and 240 are partly overlapped, and have edge portions.

Then a second dielectric layer 250 is deposited upon the second electrode 240 by a CVD process to protect the second electrode 240. The ends of the first and second dielectric layers 230 and 250 which are composed of SiO₂ or SiN, and which correspond to non-overlapped portions of the first and second 220 and 240, are removed by etching. Thus the conductive areas of the first and second electrodes are made to be exposed, thereby forming first and second outer electrode connection portions 260 and 270.

Under this condition, the both ends of the first and second dielectric layers 230 and 250 are etched by using an etching solution composed of CH₃COOH and NH₄F at a mole ratio of 2:1. Thus the conductive areas of the first and second electrodes are made to be exposed, thereby forming first and second outer electrode connection portions 260 and 270.

Then a thin film conductive layer is formed upon the first and second outer electrode connection portions 260 and 270 and upon the second dielectric layer 250. Then the portions of the first and second outer electrode connection portions 260 and 270 other than the conductive ares are removed.

Then an Al or Cr thin film of 0.1 μm or less is formed on the outer electrode connection portions so as to increase the adhesive strength. Then Cu is deposited in a thickness of 0.5 μm or less, thereby forming terminal electrodes 280. Further, on the bottom of the insulating substrate 210, there is also formed a conductive thin film. Then the portions of the conductive layer other than the areas corresponding to the first and second outer electrode connection portions 260 and 270 are removed, thereby forming terminal electrodes 280 for connecting the outer electrodes.

Then the substrate 210 is cut into halves, i.e., into a form of bars, so that the first and second outer electrode connection portions 260 and 270 with the terminal electrodes 280 formed thereon would be approximately divided into halves. Thus the conductive edges of the first and second electrodes 220 and 240 are exposed to the outside. Conductive layers are formed on the cut side faces of the substrate 210 so as to form side faces of the terminal electrodes 280 for forming the external electrodes 290 and 300. The bar shaped wafer is cut into chips to form chip type thin film capacitors. On the upper and lower faces and the side faces of the terminal electrodes 280 of the wafer chip, there are formed the first and second outer electrodes 290 and 300, thereby completing the manufacture of the chip type thin film capacitor.

As described above, the first and second electrodes 220 and 240 are formed on the insulating substrate 210, and the first and second outer electrodes 290 and 300 are connected to the former. In this thin film capacitor as shown in FIG. 5, the second dielectric layer 250 is disposed on the second electrode 240, and the protecting layer 310 is formed upon it by using polyimide which is moisture-resistant, and has a low hardening temperature of 350° C. Therefore, the first and second outer electrode connection portions 260 and 270 are protected.

According to the present invention as described above, the contact areas between the inner upper and lower electrodes and the outer electrodes are drastically increased, so as to make it possible to obtain a low ESR value. Owing to the increase in the contact areas, the formation of short circuit is prevented to avoid product defects. Further, owing to the reinforcement of the contact stability, the electrical characteristics of the capacitor are improved. Accordingly, the chip type thin film capacitor of the present invention becomes more superior.

In the above, the present invention was described based on the specific drawings, but it should be apparent to those ordinarily skilled in the art that various changes and modifications can be added without departing from the scope of the present invention as defined in the appended claims.

What is claimed is:

1. A chip type thin film capacitor comprising:
   an insulating substrate;
   a thin film type conductive first electrode formed upon said insulating substrate starting from one edge of said substrate toward an opposite edge of it, and having a first outer electrode connection portion at an edge portion corresponding to an edge of said substrate;
   a first dielectric layer formed upon said first electrode, for insulating said first electrode;
   a second electrode formed upon said first dielectric layer starting from an opposite edge of said substrate to be overlapped with a portion of said first electrode, and having a second outer electrode connection portion at an edge portion corresponding to an opposite edge of said substrate;
   a second dielectric layer formed upon an area other than said second outer electrode connection portion of said second electrode, for protecting said second electrode;

a first outer electrode part formed upon an area corresponding to said first outer electrode connection portion, for being electrically connected to said first electrode; and a second outer electrode part formed upon an area corresponding to said second outer electrode connection portion, for being electrically connected to said second electrode.

2. The chip type thin film capacitor as claimed in claim 1, wherein said first and second electrodes are composed of Al or Cu.

3. The chip type thin film capacitor as claimed in claim 1, wherein said first and second electrodes are deposited by applying a physical vapor deposition process such as sputtering or evaporating.

4. The chip type thin film capacitor as claimed in claim 1, wherein said first and second dielectric layers are composed of $SiO_2$ or SiN.

5. The chip type thin film capacitor as claimed in claim 1, wherein said first and second dielectric layers are deposited by applying a chemical vapor deposition process (CVD process).

6. The chip type thin film capacitor as claimed in claim 1, wherein said first and second outer electrode parts comprise first and second outer electrodes formed respectively upon terminal electrodes which are in turn formed in areas including said first and second electrode connection portions.

7. The chip type thin film capacitor as claimed in claim 6, wherein said terminal electrodes comprise thin films composed of an Al or Cr, for increasing an adhesive strength, and a CU layer formed after depositing Al or Cr.

8. The chip type thin film capacitor as claimed in claim 7, wherein said thin film has a thickness of 0.1 $\mu$m or less.

9. The chip type thin film capacitor as claimed in claim 7, wherein said Cu layer formed upon said thin film has a thickness of 0.5 $\mu$m or less.

10. The chip type thin film capacitor as claimed in claim 6, wherein said terminal electrodes are deposited by applying a physical vapor deposition process such as sputtering or evaporating.

11. The chip type thin film capacitor as claimed in claim 6, wherein said first and second outer electrodes are composed of a Cu layer, an Ni layer and an Sn/Pb layer formed sequentially.

12. The chip type thin film capacitor as claimed in claim 6, wherein said first and second outer electrodes are formed by plating processes.

13. The chip type thin film capacitor as claimed in claim 1, wherein a protecting layer is formed upon said second dielectric layer.

14. The chip type thin film capacitor as claimed in claim 13, wherein said protecting layer is composed of polyimide.

15. A method for manufacturing a chip type thin film capacitor, comprising the steps of:

forming a thin film conductive layer upon an insulating substrate, and removing unnecessary portions of said conductive layer to form a plurality of discontinuous mutually electrically isolated rows and columns, thereby forming a first electrode layer;

forming a first dielectric layer upon said first electrode layer to insulate said first electrode layer;

forming a thin film conductive layer upon said first dielectric layer, and removing unnecessary portions of said conductive layer to form a plurality of discontinuous mutually electrically isolated rows and columns of said conductive layer so as to form a second electrode layer, conductive areas of said second electrode layer and conductive areas of said first electrode layer being partly overlapped, and one edge portion being provided at an end of each of overlapped portions;

forming a second dielectric layer upon said second electrode layer, for protecting said second electrode layer;

removing portions of said first and second dielectric layers corresponding to non-overlapped portions of said first second electrode layers, thereby forming first and second outer electrode connection portions for said conductive layers of said first and second electrode layers;

forming a thin film conductive layer upon said second dielectric layer and said first and second outer electrode connection portions, and removing portions of said thin film conductive layer corresponding to other than said first and second outer electrode connection portions, thereby forming an upper layer of terminal electrodes for forming first and second outer electrodes;

forming a thin film conductive layer on a bottom of said insulating substrate, and removing portions of said conductive layer approximately corresponding to areas other than said first and second outer electrode connection portions, thereby forming a lower layer of terminal electrodes for forming outer electrodes;

cutting said insulating substrate into halves so as to divide said first and second outer electrode connection portions into halves in a form of bars with said terminal electrodes being formed thereon, thereby making edge portions of conductive areas of said first and second electrode layers exposed;

forming thin film conductive layers on side faces of the bar shaped cut portions of said substrate, thereby forming side faces of terminal electrodes for forming first and second outer electrodes;

cutting said bar shaped substrate into capacitor chips; and forming said first and second outer electrodes by making them electrically connected to upper faces, side faces and bottom faces of said terminal electrodes.

16. The method as claimed in claim 15, wherein said first and second outer electrode connection portions are formed by etching said first and second dielectric layers.

17. The method as claimed in claim 16, wherein an etching is carried out by using an etching solution composed of $CH_3COOH$ and $NH_4F$ at a mole ratio of 2:1.

18. The method as claimed in claim 15, wherein said first and second electrodes are composed of Al or Cu.

19. The method as claimed in claim 15, wherein said first and second electrodes are deposited by applying a physical vapor deposition process such as sputtering or evaporating.

20. The method as claimed in claim 15, wherein said first and second dielectric layers are composed of $SiO_2$ or SiN.

21. The method as claimed in claim 15, wherein said first and second dielectric layers are deposited by applying a chemical vapor deposition process (CVD process).

22. The method as claimed in claim 15, wherein said terminal electrodes comprise thin films composed of Al or Cr, for increasing an adhesive strength, and a CU film formed after depositing Al or Cr.

23. The method as claimed in claim 22, wherein said thin film has a thickness of 0.1 $\mu$m or less.

24. The method as claimed in claim 22, wherein said Cu layer formed upon said thin film has a thickness of 0.5 $\mu$m or less.

25. The method as claimed in claim 15, wherein said terminal electrodes are deposited by applying a physical vapor deposition process such as sputtering or evaporating.

26. The method as claimed in claim 15, wherein said first and second outer electrodes are composed of a Cu layer, an Ni layer and an Sn/Pb layer formed sequentially.

27. The method as claimed in claim 15, wherein said first and second outer electrodes are formed by plating processes.

28. The method as claimed in claim 15, wherein first an upper face and a bottom face of said terminal electrode are coated, and then, a protecting layer is formed upon said second dielectric layer.

29. The method as claimed in claim 28, wherein protecting layer is composed of polyimide.

* * * * *